United States Patent
Shi et al.

(10) Patent No.: US 10,108,294 B2
(45) Date of Patent: Oct. 23, 2018

(54) SWITCHING POWER CONVERTER WITH HISTORY-BASED VALLEY MODE SWITCHING

(71) Applicant: DIALOG SEMICONDUCTOR INC., Campbell, CA (US)

(72) Inventors: Fuqiang Shi, Campbell, CA (US); Cong Zheng, Campbell, CA (US); Danna Suo, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/414,593

(22) Filed: Jan. 24, 2017

(65) Prior Publication Data

US 2017/0212632 A1 Jul. 27, 2017

Related U.S. Application Data

(60) Provisional application No. 62/287,372, filed on Jan. 26, 2016.

(51) Int. Cl.
| | |
|---|---|
| *H02J 3/12* | (2006.01) |
| *G05F 1/00* | (2006.01) |
| *G06F 3/041* | (2006.01) |
| *H02M 1/08* | (2006.01) |
| *H02M 1/44* | (2007.01) |
| *H02M 3/335* | (2006.01) |
| *H02M 1/00* | (2006.01) |

(52) U.S. Cl.
CPC .......... *G06F 3/0416* (2013.01); *G06F 3/0418* (2013.01); *H02M 1/08* (2013.01); *H02M 1/44* (2013.01); *H02M 3/33523* (2013.01); *H02M 2001/0025* (2013.01)

(58) Field of Classification Search
CPC ........ H02M 1/126; H02M 1/14; H02M 1/143; H02M 1/15; G05F 1/467
USPC ....... 323/242, 243, 246, 266, 274, 275, 280, 323/283–287; 363/39
See application file for complete search history.

(56) References Cited

U.S. PATENT DOCUMENTS

| | | | | |
|---|---|---|---|---|
| 7,358,706 | B2* | 4/2008 | Lys | H02M 1/4225 323/222 |
| 7,463,011 | B2* | 12/2008 | Sharma | H02M 3/33515 323/283 |
| 2006/0261794 | A1* | 11/2006 | May | H02M 3/157 323/283 |
| 2008/0129264 | A1* | 6/2008 | Moussaoui | H02M 3/156 323/283 |
| 2010/0207594 | A1* | 8/2010 | Davoudi | H02M 3/157 323/283 |
| 2012/0293254 | A1* | 11/2012 | Liu | H02M 3/07 330/127 |

* cited by examiner

*Primary Examiner* — Gary Nash
(74) *Attorney, Agent, or Firm* — Haynes and Boone, LLP (57) ABSTRACT

History-based valley mode switching techniques and systems are provided to reduce the frequency spreading of switching noise in a switching power converter.

19 Claims, 7 Drawing Sheets

SWITCHING POWER CONVERTER WITH HISTORY-BASED VALLEY MODE SWITCHING

CROSS-REFERENCE TO RELATED APPLICATIONS

This application claims the benefit of U.S. Provisional Application No. 62/287,372, filed Jan. 26, 2016, the contents of which are hereby incorporated by reference in their entirety.

TECHNICAL FIELD

This application relates to switching power converters, and more particularly to circuits and techniques for reducing switching noise for valley mode switching.

BACKGROUND

In a flyback switching power converter, a power switch transistor cycles on to conduct a current through a primary winding in the transformer. When the power switch transistor turns off, a secondary winding in the transformer conducts to deliver power to a load. The cycling on-and-off of the power switch transistor subjects it to stress. For example, after the secondary current ramps down to zero, a reflected voltage on the primary winding begins to resonantly oscillate. The voltage stress on the power switch transistor is thus exacerbated if it switches on during a peak of the resonant voltage oscillation.

To reduce this voltage stress, various valley mode switching schemes have been implemented. The power switch transistor is cycled on at the voltage local minimums of the reflected voltage oscillation during valley mode switching operation (each voltage local minimum being designated as a "valley" in valley mode switching). Since the reflected voltage on the primary winding is at a local minimum (or in its vicinity) when the power switch transistor is switched on, valley mode switching operation reduces voltage stress on the power switch transistor. But the frequency of the power switch cycling is also a concern in flyback converters due to the associated switching noise.

Switching noise acts as electromagnetic interference to an electronic system such as a smartphone or tablet being powered by the flyback converter. For example, a touchscreen may be driven with a sensing signal having a certain frequency such as 300 KHz. If the flyback switching noise is within the same frequency band used for the touchscreen sensing signal, the touchscreen operation may have interference from the switching noise resulting from the cycling of the power switch transistor. Modern high-sensitivity touchscreens are particularly susceptible to such interference. For example, touchscreens have been developed such that users may interact with the touchscreens even while wearing gloves. This increased sensitivity for touchscreens heightens their sensitivity to flyback switching power converter switching noise. Given this sensitivity, it is conventional for a touchscreen controller to monitor the noise across potential frequency bands for the sensing signal so that the sensing frequency may be chosen accordingly.

In valley mode switching operation at a steady state load condition, the same valley will tend be used in each switching cycle such that the switching noise becomes concentrated at the resulting constant switching frequency and its harmonics. Despite this concentration, such conventional valley mode switching operation will tend to dither between the selection of a first local minimum and a subsequent second local minimum if the triggering event for the selection occurs around the time of the first local minimum. In one switching cycle, the triggering event may occur slightly before the first local minimum such that the controller selects the first local minimum for the switch on time. In another switching cycle, the triggering event may occur slightly after the first local minimum such that the controller must select for the second local minimum. The resulting dithering results in substantial noise power being spread in the spectral bands between the switching power peaks. The noise energy becomes too widespread across the frequency bands between the harmonics such that a touchscreen controller may have trouble locating a relatively noise-free band in which to drive the sensing signal.

Accordingly, there is a need in the art for switching power converters with improved valley mode switching techniques having reduced noise spreading.

SUMMARY

To reduce switching noise interference while maintaining efficiency, a valley mode switching (VMS) switching power converter is provided having a controller that selects for a local minimum based upon a triggering event and also based upon the local minimum selection in a preceding switching cycle. The resulting technique may thus be denoted as a "history-based" valley mode switching scheme since the current valley selection depends on the previous valley selection. In a current switching cycle, the controller receives a triggering event such as a clock edge or other suitable signal. Following this triggering event, the controller identifies the subsequent local minimum in the primary winding reflected voltage. Since there is a series of local minimums for the reflected winding following the preceding switch off time, the subsequent local minimum has an index or number within its series. Similarly, the local minimum selected for in the preceding switching cycle also has an index for when it occurred in its series. The controller compares the index for the identified local minimum in the current switching cycle to the index for the previously selected local minimum in the preceding switching cycle. Should the index for the identified local minimum be one less than the index for the previously selected local minimum, the controller continues to select for the previously selected local minimum following the identified local minimum as the switch on time for the current switching cycle. Conversely, should the identified local minimum not be one less than the index for the previously selected local minimum, the controller proceed to select the identified local minimum as the switch on time for the current switching cycle. The resulting use of the switching history prevents the excessive dithering that occurs in conventional VMS schemes such that the spreading of switching noise is alleviated. These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
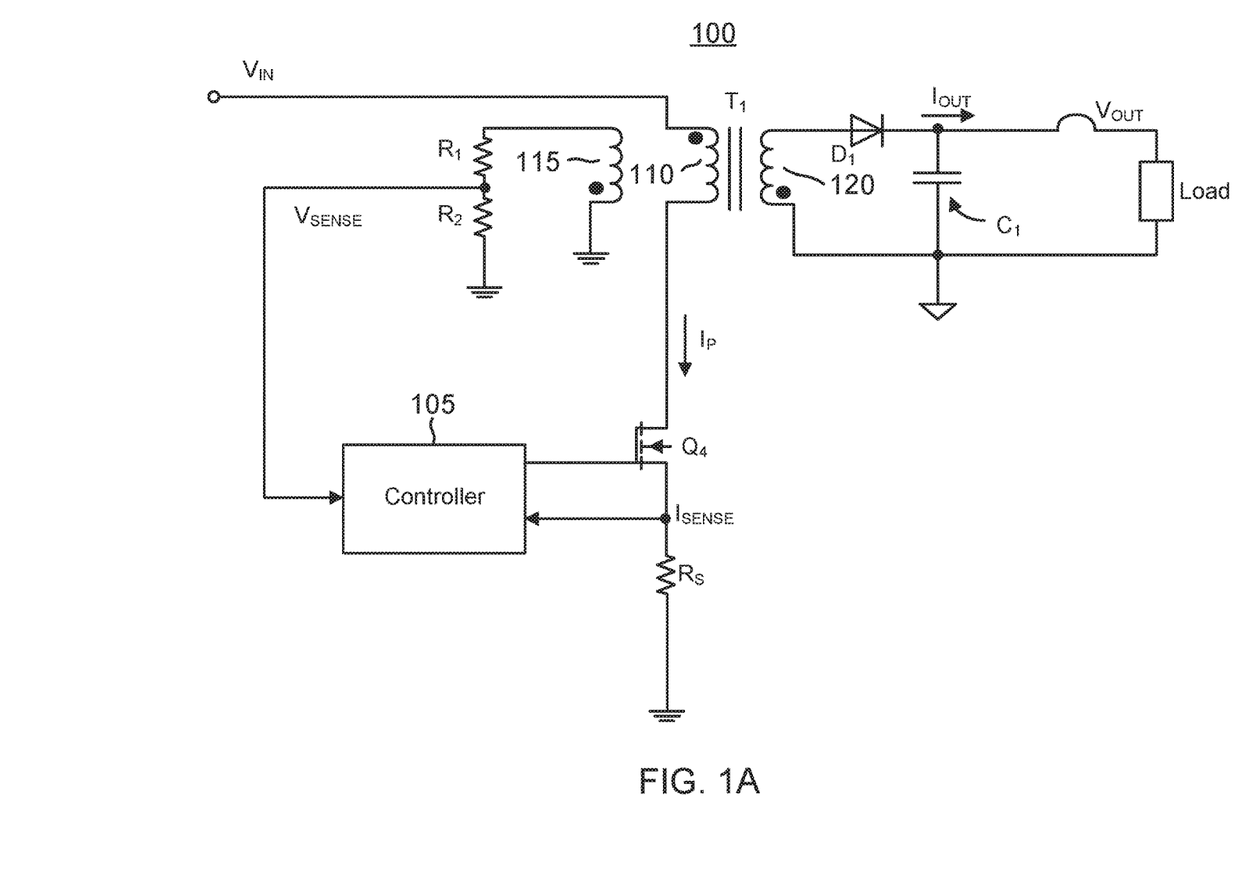
FIG. 1A is a circuit diagram of a flyback converter in accordance with an embodiment of the disclosure.

To reduce noise spreading, a history-based valley mode switching scheme is provided in which the selection of a valley in a current switching cycle depends upon the selection in a preceding cycle. The following discussion will be directed to a flyback switching power converter but it will be appreciated that the resulting control techniques may be widely applied to other types of switching power converters. This history-based approach to valley mode switching (VMS) may be better appreciated with regard to an example flyback converter 100 as shown in FIG. 1A. Flyback converter 100 includes a controller 105 configured to practice history-based VMS. A rectified input voltage ($V_{IN}$) drives a primary winding 110 of a transformer T1 when controller 105 switches on a power switch transistor Q4. In flyback switching power converter 100, power switch transistor Q4 is a MOSFET (NMOS) transistor but it will be appreciated that bipolar junction transistor (BJT), GaN, IGBJT, or other suitable power switches may be used in alternative embodiments. To cycle the power switch transistor Q4 on, controller 105 charges its gate. Based upon the rectified input voltage $V_{IN}$ and a magnetizing inductance for the transformer T1, a primary winding current $I_P$ in primary winding 110 then ramps up from zero to a peak current value, whereupon controller 105 switches off power switch transistor Q4 to complete a switching cycle. To sense when the desired peak current has been achieved, controller 105 receives an $I_{SENSE}$ signal such as from the voltage on a sensing resistor $R_S$ coupled between the source of power switch transistor Q4 and ground. Controller 105 controls the peak primary current responsive to a feedback voltage ($V_{SENSE}$) derived from a reflected voltage on an auxiliary winding 115. When controller 105 switches off power switch transistor Q4, a rectifying diode $D_1$ coupled to a secondary winding 120 of transformer T1 becomes forward biased such that the stored magnetic energy in transformer T1 drives a secondary current $I_{OUT}$ through secondary winding 120 to produce an output voltage $V_{OUT}$ across a load as filtered by a load capacitor $C_1$. It will be appreciated that rectifying diode D1 may be replaced by a synchronous rectification (SR) switch in alternative embodiments. This delivery of energy to the load produces a reflected voltage on auxiliary winding 115 that is a function of the voltage drop across the diode $D_1$ and the output voltage $V_{OUT}$. As this energy delivery is depleted, the current in secondary winding 120 will drop to zero such that there is no voltage drop across diode $D_1$, whereupon the reflected voltage across the auxiliary winding is directly proportional to the output voltage $V_{OUT}$. This time is denoted as the transformer reset time (Trst) and represents the ideal time to sample the reflected voltage through $V_{SENSE}$ to obtain an accurate estimate of the output voltage $V_{OUT}$. It will be appreciated an optocoupler may be used to sense the output voltage $V_{OUT}$ rather than using such a "primary-only" sensing in alternative embodiments.

Figure 1B:
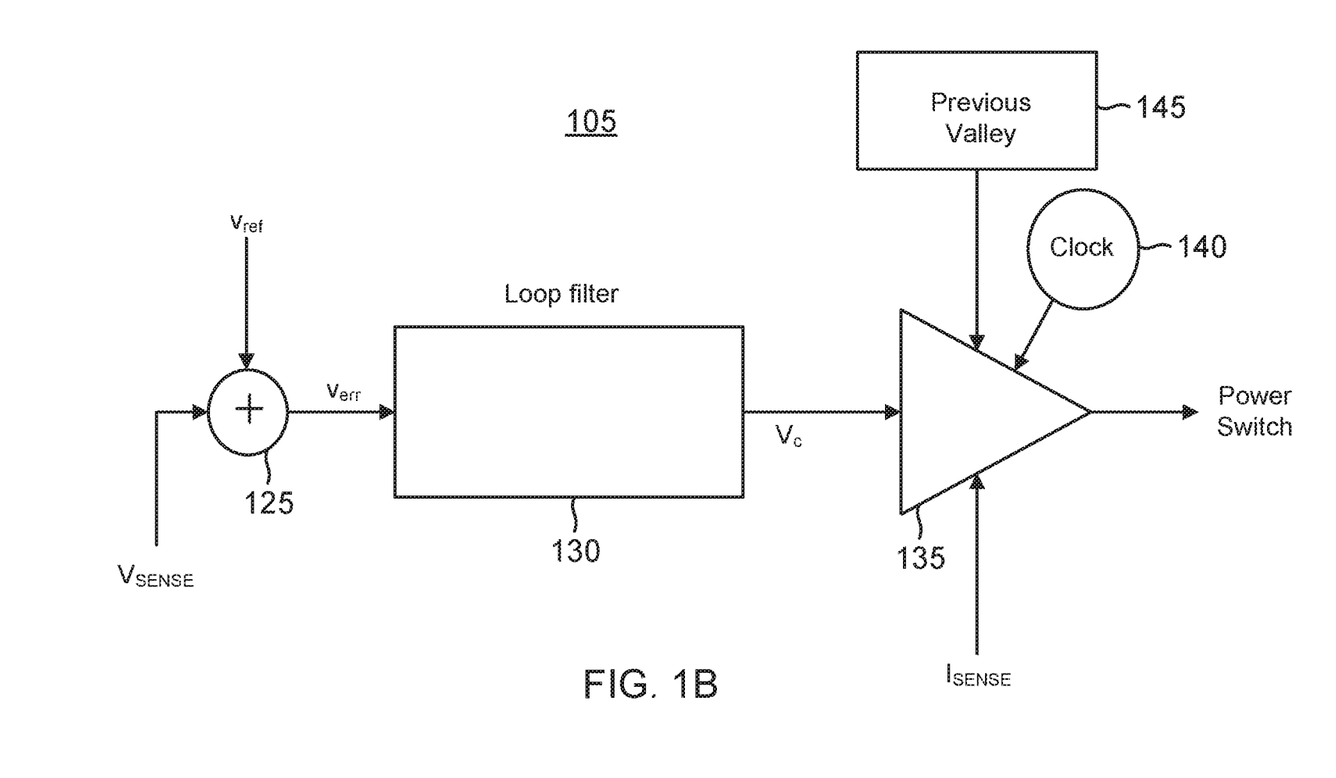
FIG. 1B is a block diagram for the controller in the flyback converter of FIG. 1A.

Controller 105 is shown in more detail in FIG. 1B. A differential amplifier 125 amplifies a difference between the $V_{SENSE}$ feedback voltage and a reference voltage Vref such as a bandgap voltage to provide an error voltage signal Verr to a loop filter 130. Loop filter 130 filters the error voltage signal Verr to produce a control voltage Vc. In a pulse width modulation (PWM) mode of operation, a switch control logic circuit 135 determines the on-time (pulse width) for a current switching cycle responsive to the control voltage Vc. For example, switch control logic circuit 135 may determine the pulse width through a linear function of the control voltage Vc. Regardless of whether pulse width modulation is being used, switch control logic circuit 135 determines which valley should be used to switch on power switch Q4 in a current switching cycle based upon the history-based VMS techniques discussed further herein. For example, an on-time determination in switch control logic circuit 135 may be triggered by an edge of a clock signal from a clock source 140. Responsive to the clock edge (or another suitable triggering event) and also to the valley selection in a previous switching cycle as stored in a memory 145, switch control logic circuit 135 selects the appropriate valley (local minimum) for the reflected voltage on primary winding 110 (FIG. 1A) in which it will switch on power switch transistor Q4 in a current switching cycle. In a pulse width modulation (PWM) mode of operation, switch control logic circuit 135 then switches off power switch transistor Q4 after the desired peak current has been achieved as determined through the $I_{SENSE}$ signal discussed with regard to FIG. 1A.

Figure 2A:
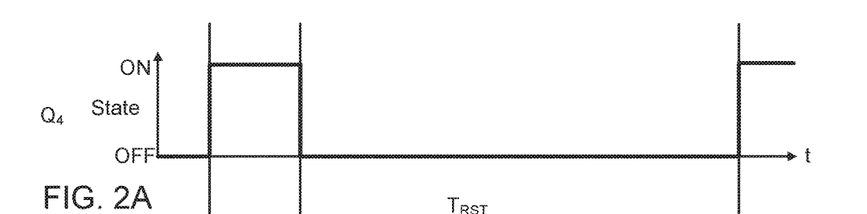
FIG. 2A is a waveform for a switching cycle of the power switch in the flyback converter of FIG. 1A.
Figure 2B:
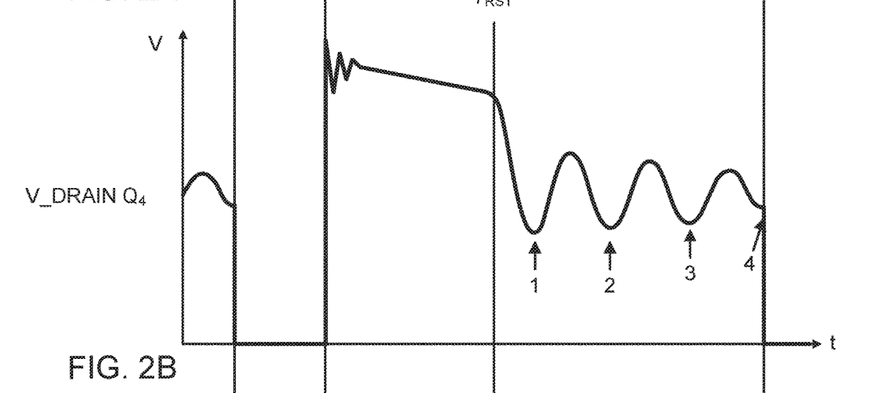
FIG. 2B illustrates the drain voltage for the power switch during the switching cycle of FIG. 2A.
Figure 2C:
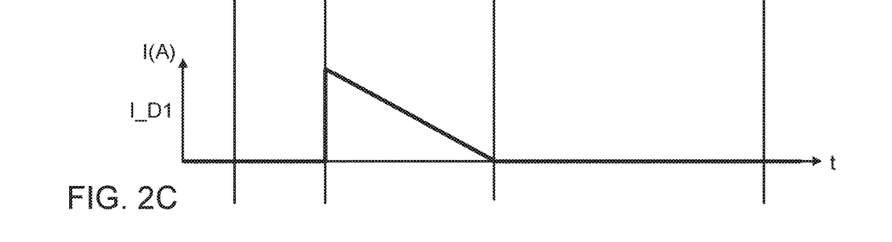
FIG. 2C illustrates the secondary current resulting from the switching cycle of FIG. 2A.

Some operational waveforms for flyback converter 100 will now be discussed. The on and off state for power switch transistor Q4 in an example power switch cycle is shown in FIG. 2A. When power switch transistor Q4 is on, its drain voltage is grounded as shown in FIG. 2B, When power switch transistor Q4 is turned off, a current I_D1 through diode D1 (FIG. 1A) pulses high and then ramps back down to zero as shown in FIG. 2C. The time at which the current I_D1 ramps to zero is designated as the transformer reset time $T_{RST}$ as discussed earlier. Following the transformer reset time $T_{RST}$, the drain voltage of power switch Q4 begins to oscillate through local minimums such as local minimums 1, 2, 3, and 4 as shown in FIG. 2B. This resonant oscillation or ringing is caused by parasitic effects, including the magnetizing inductance for primary winding 110 (FIG. 1A) and the drain-to-source capacitance for power switch Q4 in parallel with the inter-winding capacitance of primary winding 110.

Referring again to FIG. 1A, controller 105 may monitor the $V_{SENSE}$ signal as derived from auxiliary winding 115 through the voltage divider formed by resistors $R_1$ and $R_2$ to determine the local minimum times (valley times) for the reflected voltage on primary winding 110. Since such determination is conventional, the circuitry for this valley determination is not discussed further herein. But what is not conventional is that memory 145 stores the time (or valley number) for the previous switching cycle to influence the selection of the current valley by switch control logic circuit 135.

As discussed above, the selection of a valley in conventional VMS techniques tends to be unstable such that a conventional controller will tend to oscillate between selecting a given valley or a subsequent one in a switching cycle. This dithering spreads the EMI energy from the power switch cycling in the frequency domain such that it becomes problematic to find noise-free bands for operation of sensitive components such as touchscreens. But the history-based VMS disclosed herein prevents this excessive noise spreading. This history-based VMS technique may be better appreciated with regard to the drain voltage V_DRAIN waveform for power switch transistor Q4 shown in FIG. 3. Each valley for the drain voltage may be deemed to reside within a corresponding time zone or range of the drain voltage waveform. For example, a zone 1 corresponds to the time range beginning prior to the transformer reset time and ending at the first valley (valley 1) following the transformer reset time. A zone 2 corresponds to the time range from valley 1 to a following valley (valley 2). Similarly, a zone 3 corresponds to the time from valley 2 to the subsequent valley (valley 3). Finally, a zone 4 corresponds to the time from valley 3 to the subsequent valley (valley 4).

In general, the ith zone ends in the ith valley, where i is an arbitrary positive integer. Without any history-based control, the zone identity determines what valley is selected for the power switch turn on time. In that regard, the ith zone corresponds to the ith valley. For example, if a conventional non-dithering power switch logic circuit (a conventional equivalent to power switch logic circuit 135 of FIG. 1B) receives a triggering clock edge during zone 1, then valley 1 is selected as the valley for the valley mode switch turn on time. Similarly, a triggering clock edge during the zone 2 would result in the selection of zone 2, and so on such that a triggering clock edge in the ith zone results in the selection of the ith valley.

Figure 3:
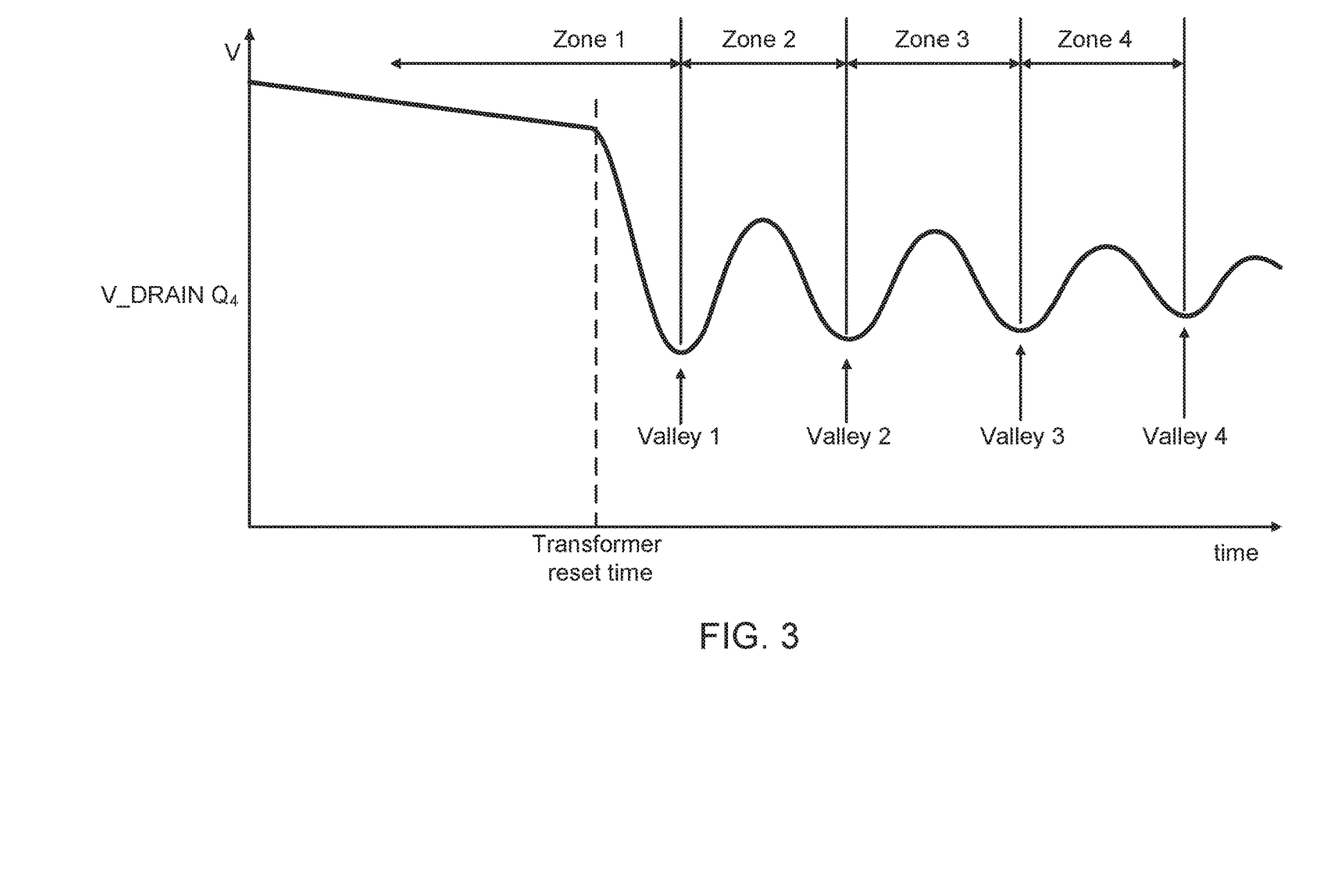
FIG. 3 illustrates the classification of the drain voltage waveform of FIG. 2C into unexpanded zones for valley mode switching (VMS).

To address the excessive noise spreading of such conventional zones, the history-based VMS technique disclosed herein uses the identity of the valley used in the preceding switching cycle to influence the valley selection in a current switching cycle. For example, the valleys may be numbered in succession as shown in FIG. 3, starting from the first valley following the "knee" (the transformer reset time) for the power switch drain voltage. Although such a successive numbering is convenient, it will be appreciated that the identification of each valley in alternative embodiments may be performed without such a successive numbering of the valleys. The following discussion will thus be directed to a successive numbering of the valleys without loss of generality.

Figure 4:
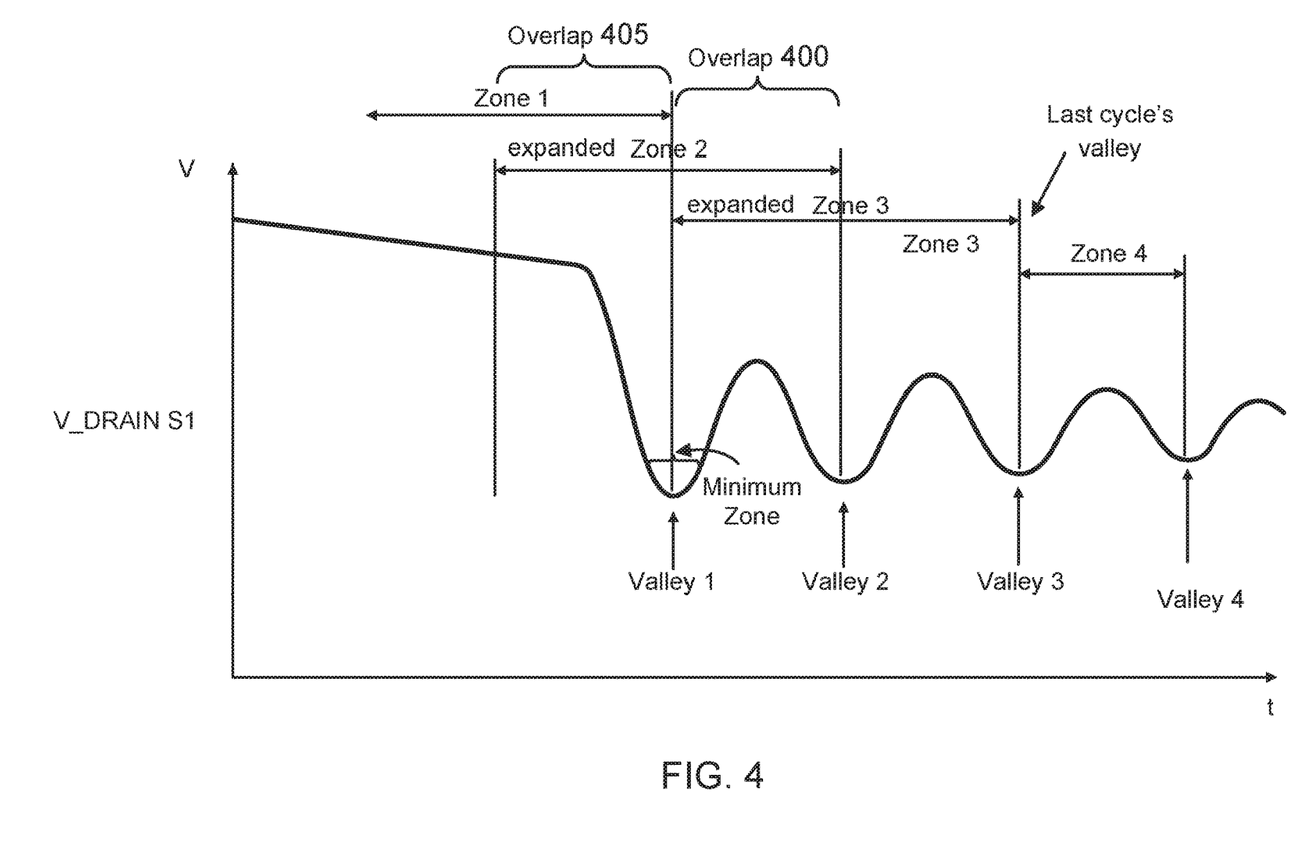
FIG. 4 illustrates the classification of the drain voltage waveform of FIG. 2C into plurality of expanded zones for a history-based VMS technique in accordance with embodiment of the disclosure.

Given this valley identification, the identity of the previously-selected valley may be represented by an integer number m, where m is a positive integer. The history-based VMS technique disclosed herein expands the conventional zones 1 through m responsive to this identification. For example, expanded zones 1, 2, and 3 would be used for a current switching cycle if the previous switching cycle selected valley 3 as shown in FIG. 4 (in which case, the integer m equals 3). The selection of a valley then corresponds to which zone (either expanded or not) that corresponds to the triggering event time. Since, there is an overlap for the expanded zones, there is a possibility that the triggering event occurs in such an overlap region. For example, the triggering event may occur in an overlap region 400 that falls in both expanded zone 3 and expanded zone 2. In such a case, the greater zone is selected (the one having the valley the last in time). So if the triggering event occurred in overlap region 400, valley 3 would be selected.

It may thus be appreciated that the conventional dithering between successive zones is thus cured by the history-based VMS technique. Similarly, if the triggering event occurs in an overlap region 405 that is shared by expanded zones 1 and 2, valley 2 is chosen since expanded zone 2 is subsequent to expanded zone 1. Zone 4 is still a conventional zone 4 since this zone is subsequent to valley 3.

Figure 5:
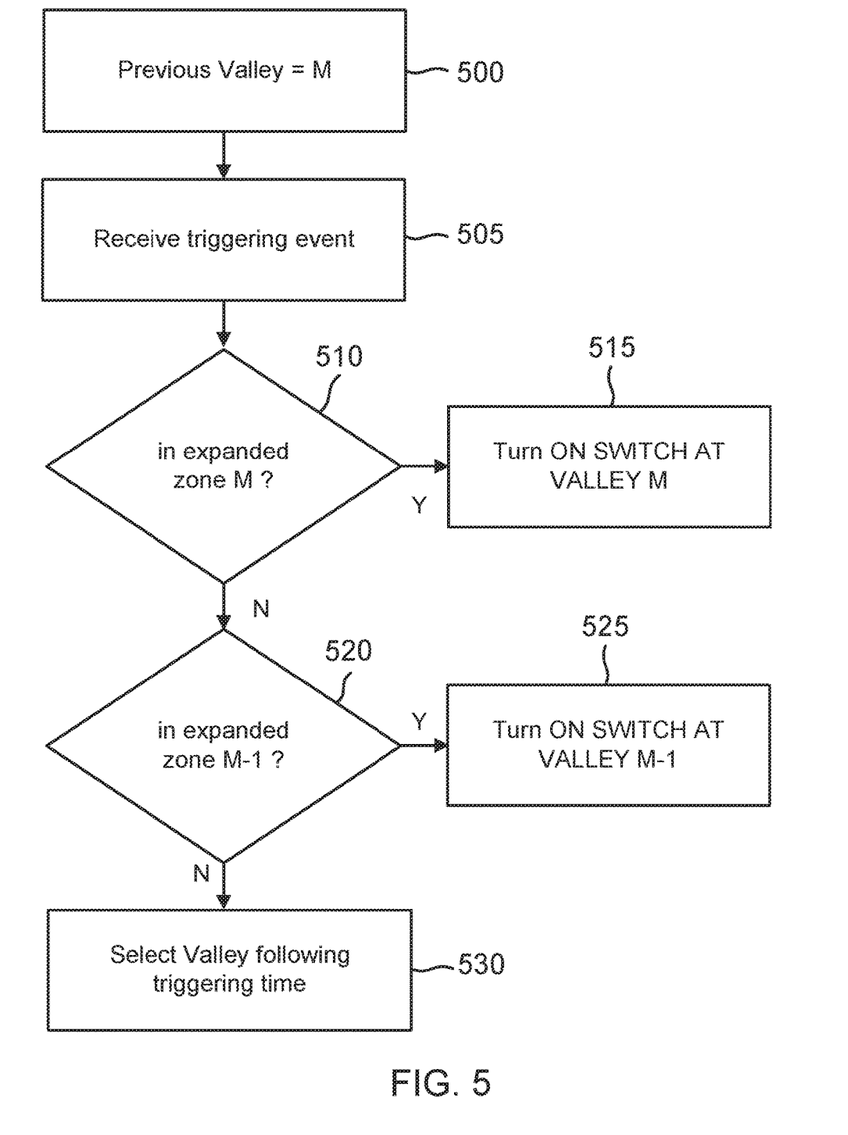
FIG. 5 is a flow chart for a history-based VMS technique in accordance with an aspect of the disclosure.

The resulting valley selection algorithm with regard to these expanded zones is shown in FIG. 5. Referring again to FIG. 1B, memory 145 stores the identity of the previous switching cycle's valley selection so that the corresponding zones in the current switching cycle may be expanded by power switch control logic circuit 135. The valley selection algorithm for a current switching cycle thus begins with an act 500 of identifying the valley selected in the previous switching cycle. In FIG. 5, the previously-selected valley is the mth valley. Zones 1 through m are thus expanded zones in response to this identification. In a step 505, a triggering event for a valley selection is received such as the receipt of a clock edge and mapped to the corresponding zone (or zones should the triggering event fall within an overlap region). If the triggering event time maps to expanded zone in as determined in a step 510, then valley m is selected for the switch turn on time in a step 515. Step 510 is thus equivalent to determining whether the triggering event time occurred between valley (m−2) and valley m.

If the determination in step 510 is negative, the algorithm proceeds to determine whether the triggering event time maps to expanded zone m−1 in a step 520. If the determination is step 520 is positive, then valley m−1 is selected in a step 525. Note that the order of steps 510 and 520 accounts for the possibility of an overlap. In particular, if the triggering event time occurs in the overlap between expanded zone m and m−1, then valley m is selected through the execution of steps 510 and 515 before step 520. Should the triggering event occur outside of expanded zones m and m−1 in a step 530, then the valley immediately following the triggering time is selected. Step 520 is equivalent to determining whether the triggering event time occurs between valley (m−3) and valley (m−2).

Figure 6:
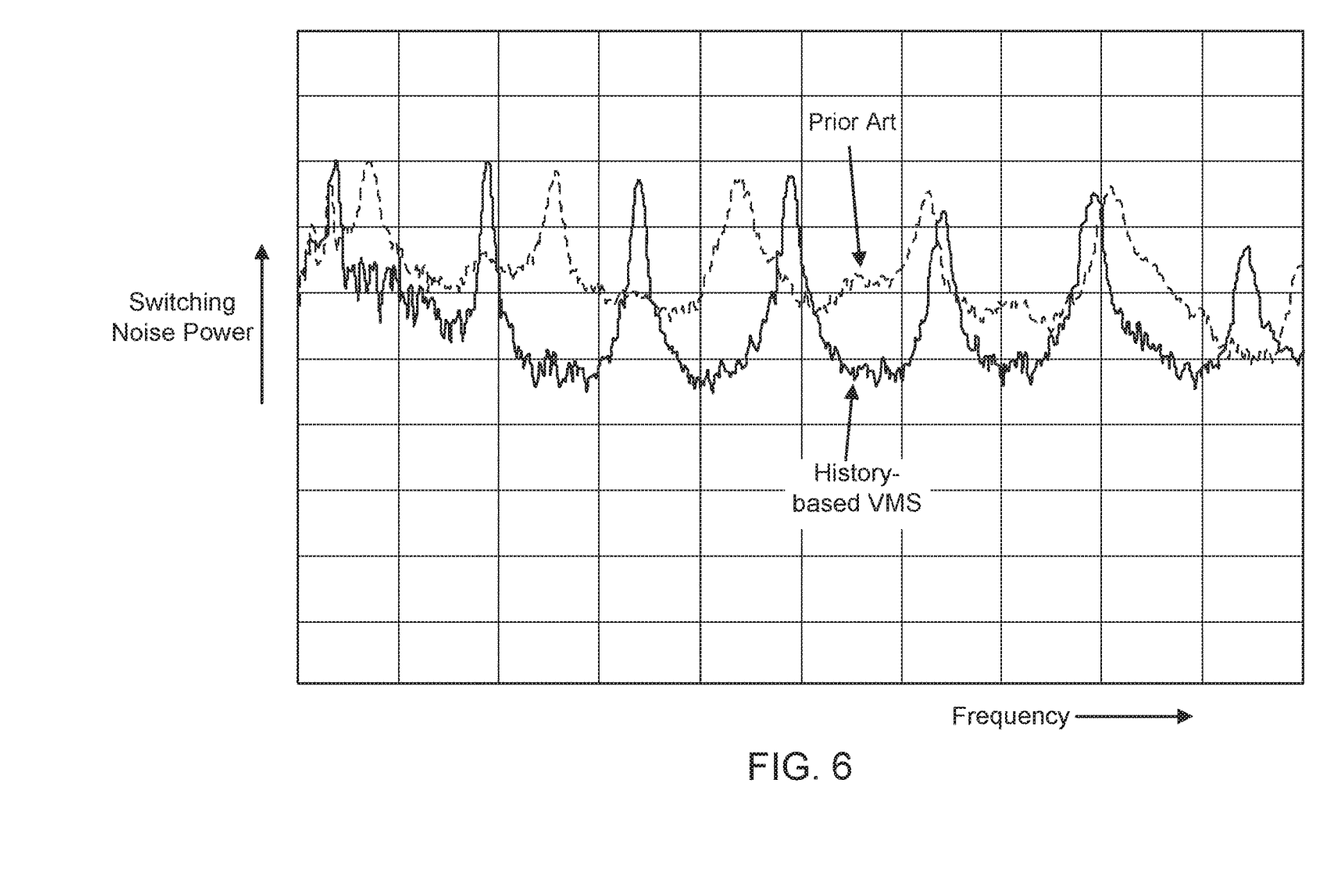
FIG. 6 shows EMI waveforms for a history-based VMS technique and for a conventional VMS technique.

FIG. 6 depicts the noise spectral power as a function of frequency for a history-based VMS technique and for a conventional VMS technique that has no dithering. Even though dithering was not implemented for the conventional VMS technique, it will tend to dither should a triggering event occur in between zones. For one cycle, the conventional VMS technique will select an earlier zone's valley whereas for another cycle it will select for the subsequent zone's valley due to the triggering event falling between the two zones. The noise spectral power between harmonic peaks for the conventional VMS technique is thus relatively high. Advantageously, the same peak powers occur for the history-based VMS yet the noise power between the peaks is markedly reduced. In this fashion, the history-based VMS techniques disclosed herein reduce the spreading of switching noise power yet achieve the advantages of traditional VMS techniques with regard to lowering voltage stress on the power switch transistor.

Since the local minimum is a point in time that technically is of infinite resolution, the real-world selection of a local minimum will always have some uncertainty as to whether the true minimum was selected. The following claims will thus be directed to the selection of a minimum zone such as illustrated for valley 1 in FIG. 4. This zone is a time period that includes the true local minimum. In other words, a controller switching the power switch on at some time during such a minimum zone is the real-world equivalent of switching on the power switch at the exact time of the local minimum. Moreover, a controller may be deemed to select for a local minimum even if the resulting selection results in the switch on time to instead occur either before or after the selected minimum so long as the resulting selection occurs after the preceding local minimum and before the subsequent local minimum.

The VMS technique discussed with regard to FIG. 5 may be summarized as follows with regard to a first switching cycle that is followed by a second switching cycle. In turn, a third switching cycle follows the second switching cycle. The method includes an act of cycling a power switch off in a first switching cycle to cause a first reflected voltage on a primary winding to oscillate. An example of the first reflected voltage is shown in FIG. 3. The method also includes an act that establishes the history of a local minimum selection. In particular, the method includes an act of cycling the power switch on in a second switching cycle during an nth local minimum zone of the first reflected voltage in the first switching cycle, wherein n is a positive integer. The selection of valley 2 in a preceding switching cycle as discussed with regard to FIG. 4 is an example of this act.

The selection of the valley in the third switching cycle will thus be dependent on the selection in the second switching cycle. The method thus includes an act of cycling the power switch off in the second switching cycle to cause a second reflected voltage on the primary winding to begin oscillating and also an act that occurs after the second reflected voltage has begun oscillating and comprises receiving a triggering event for the selection of a switch on time for a third switching cycle, wherein the triggering event is followed by an mth local minimum of the second reflected voltage, wherein m is a positive integer. Finally, the method includes the act of cycling the power switch on in the third switching cycle at an (m+1)th local minimum zone of the second reflected voltage responsive to m equaling (n−1) and cycling the power switch on in the third switching cycle at an mth local minimum zone of the second reflected voltage responsive to m not equaling (n−1).

Those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A valley mode switching method for a flyback converter, comprising:
   cycling a power switch off in a series of switching cycles to cause a reflected voltage on a primary winding coupled to the power switch to oscillate through a series of local minimums in each switching cycle;
   cycling the power switch on in a first switching cycle at a selected one of the local minimums, wherein the selected local minimum is preceded by a first preceding one of the local minimums that in turn is preceded by a second preceding one of the local minimums; and
   cycling the power switch on at the selected local minimum in a second switching cycle following the first switching cycle responsive to a receipt of a first triggering event prior to the selected local minimum and subsequent to the second preceding local minimum.

2. The method of claim 1, wherein the receipt of the first triggering event comprises a receipt of a triggering clock edge.

3. The method of claim 1, further comprising:
   cycling the power switch at the first preceding local minimum in a third switching cycle following the second switching cycle responsive to a receipt of a second triggering event prior to the second preceding local minimum.

4. The method of claim 1, further comprising:
   cycling the power switch at a subsequent one of the local minimums responsive to a receipt of a second triggering event subsequent to the selected local minimum and prior to the subsequent local minimum.

5. The method of claim 1, further comprising:
   prior to the cycling on of the power switch in the first switching cycle, receiving a feedback voltage from a load for the flyback converter;
   comparing the feedback voltage to a reference voltage to generate an error signal;
   filtering the error signal to generate a control voltage;
   processing the control voltage to determine a peak current; and
   switching the power switch off in the first switching cycle responsive to detecting that a current through the power switch equals the peak current.

6. The method of claim 5, wherein the power switch is an NMOS power switch transistor, and wherein the reflected voltage is a drain voltage for the NMOS power switch transistor.

7. The method of claim 6, wherein receiving the feedback voltage comprises receiving the feedback voltage from an auxiliary winding for the flyback converter.

8. The method of claim 1, further comprising: operating a touchscreen controller by sensing a touchscreen signal within a frequency band between harmonics of a switching frequency for the power switch.

9. The method of claim 1, wherein the cycling of the power switch occurs while a load for the flyback converter is in a steady state.

10. A controller for a flyback converter, comprising:
    a loop filter for filtering an error signal to provide a control voltage;
    a switch control logic circuit configured to process the control voltage to determine an on time for a power switch in a current switching cycle;
    a memory for storing an identity of a selected local minimum for a reflected voltage on a primary winding of the flyback converter in a preceding switching cycle, wherein the selected local minimum is preceded by a first preceding local minimum that in turn is preceded by a second preceding local minimum; and
    a clock for providing a clock signal, wherein the switch control logic circuit is further configured to cycle the power switch on in the current switching cycle at the selected local minimum responsive to a receipt of a first edge for the clock signal prior to the selected local minimum and subsequent to the second preceding local minimum.

11. The controller of claim 10, further comprising:
    a comparator configured to compare a digitized feedback voltage to a reference voltage to generate the error signal.

12. The controller of claim 11, further comprising a sensor configured to sense the feedback voltage and to digitize the feedback voltage to form the digitized feedback voltage.

13. The controller of claim 10, further comprising:
an error amplifier configured to compare a feedback voltage to a reference voltage to generate the error signal.

14. The controller of claim 10, wherein the wherein the switch control logic circuit is further configured to cycle the power switch on in a subsequent switching cycle at the first preceding minimum responsive to a receipt of a second edge for the clock signal prior to the second preceding local minimum.

15. The controller of claim 10, wherein the switch control logic circuit is further configured to monitor an Isense signal to determine an off time for the power switch in the current switching cycle.

16. A flyback converter, comprising:
a transformer including a primary winding;
a power switch coupled to the primary winding;
a memory for storing an identity of a selected local minimum of an oscillation of a reflected voltage on the primary winding during a first cycle of the power switch, wherein the selected local minimum is preceded by a first local minimum that in turn is preceded by a second local minimum; and
a controller configured to switch on the power switch at the selected local minimum in a second cycle of the power switch responsive to a receipt of a triggering event following the second local minimum and prior to the selected local minimum.

17. The flyback converter of claim 16, wherein the power switch is an NMOS transistor, and wherein the reflected voltage is also a drain voltage for the NMOS transistor.

18. The flyback converter of claim 16, further comprising:
a loop filter for processing an error signal to generate a control voltage, wherein the controller is further configured to determine a pulse width for the first switching cycle responsive to the control voltage.

19. The flyback converter of claim 18, further comprising:
a comparator for generating the error signal responsive to a comparison of a feedback voltage to a reference voltage.

* * * * *